United States Patent [19]
Duck et al.

[11] Patent Number: 5,745,626
[45] Date of Patent: Apr. 28, 1998

[54] METHOD FOR AND ENCAPSULATION OF AN OPTICAL FIBER

[75] Inventors: Gary Stephen Duck, Nepean; Neil Teitelbaum, Ottawa; Yihao Cheng, Kanata, all of Canada

[73] Assignee: JDS Fitel Inc., Nepean, Canada

[21] Appl. No.: 666,228

[22] Filed: Jun. 20, 1996

[51] Int. Cl.⁶ .................................................. G02B 6/38
[52] U.S. Cl. .................. 385/96; 385/51; 385/78; 65/407; 65/408
[58] Field of Search ..................... 65/412, 407, 408, 65/409; 385/96–99, 43, 51

[56] References Cited

U.S. PATENT DOCUMENTS 5,251,277  10/1993  Young, Jr. ............................. 385/51
5,295,210   3/1994  Noland et al. ........................ 385/51
5,450,513   9/1995  Bookbineder et al. ................ 385/99
5,524,158   6/1996  Button et al. ........................ 385/51
5,594,822   1/1997  Berkey ................................. 385/43

*Primary Examiner*—John Ngo
*Attorney, Agent, or Firm*—Neil Teitelbaum & Associates

[57] ABSTRACT

A method and device is provided wherein a reinforcement is provided for one or more optical fibers. One or more fibers are inserted into a sleeve made of a material that is substantially the same as the material of the cladding of the one or more optical fibers. The bore of the sleeve is sized to accommodate the one or more optical fibers; After the one or more optical fibers is inserted into the sleeve sufficient heat is applied to the sleeve for a duration to collapse the sleeve onto the one or more optical fibers. Preferably, the sleeve is a glass pre-form consisting substantially of 90% or greater silica.

14 Claims, 6 Drawing Sheets

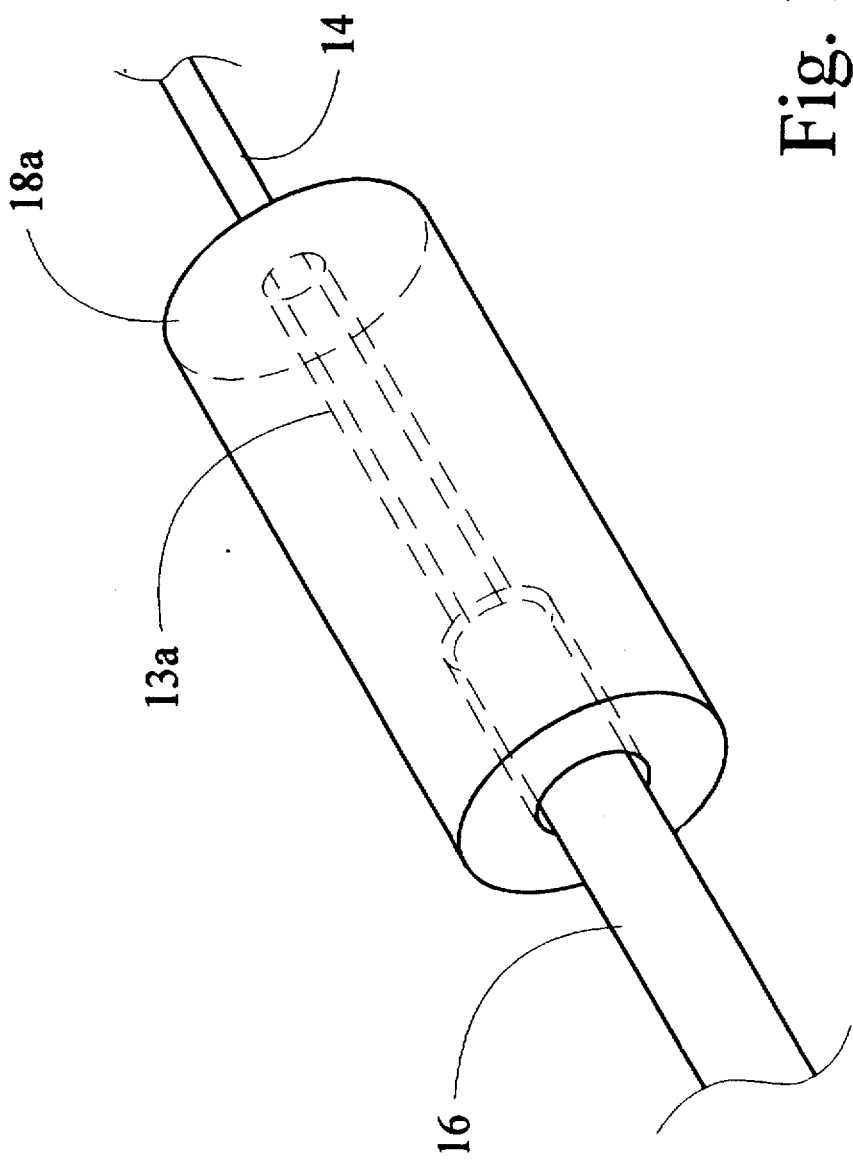

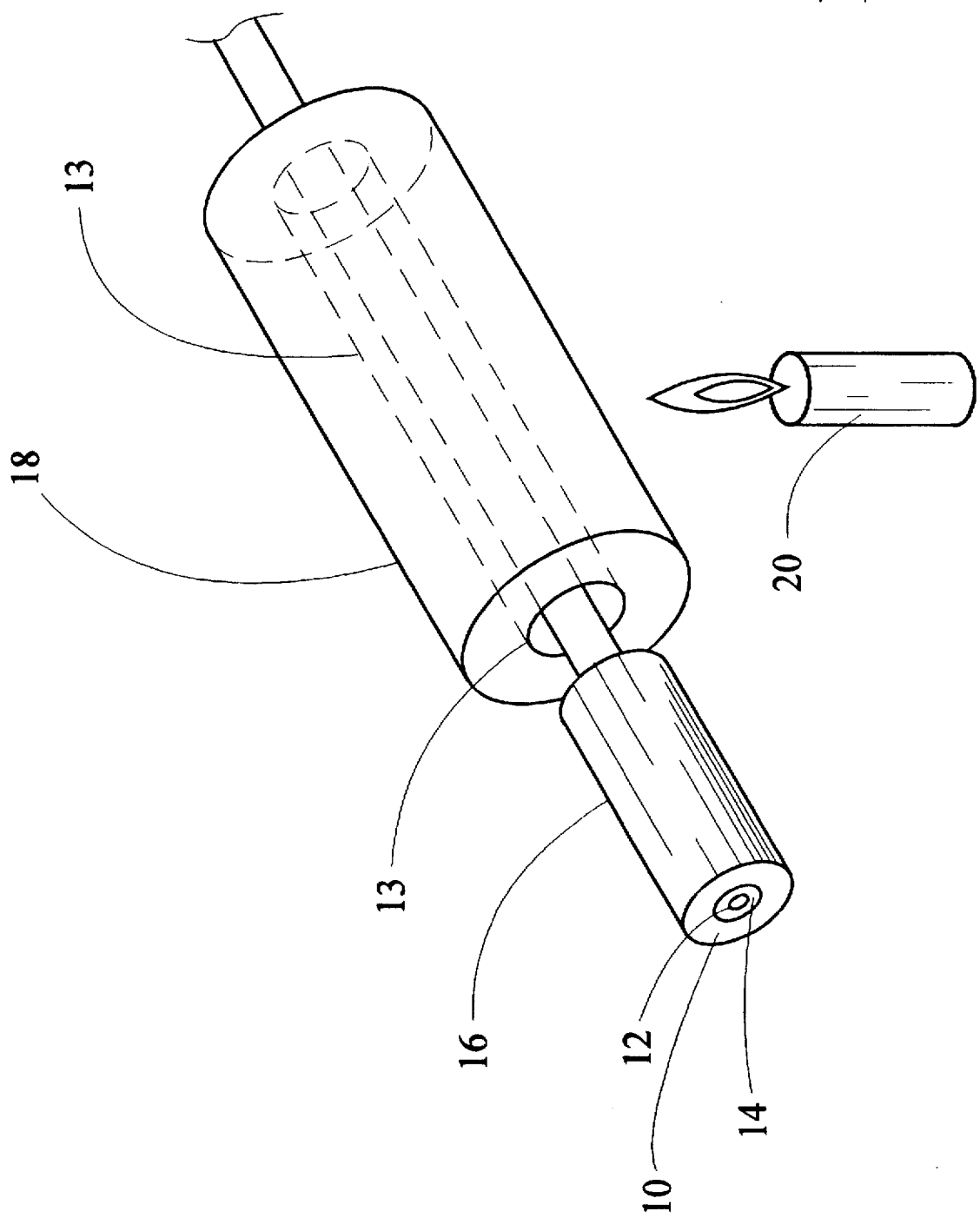

METHOD FOR AND ENCAPSULATION OF AN OPTICAL FIBER

FIELD OF THE INVENTION

This invention relates to an optical system and method for epoxyless coupling of a pre-formed ferrule to an optical fiber. More particularly, an aspect of the invention relates to hermetically enveloping at least a portion of an optical fiber with a pre-formed ferrule of a similar and/or compatible material.

BACKGROUND OF THE INVENTION

Optical fibers are used in a wide variety of applications ranging from telecommunications to medical technology and optical components. Because of their unique structure, optical fibers are capable of highly accurate transmission of light, which is relatively unaffected by interference, diffusion, and other signal de-enhancing phenomena. However, for optical fibers to function at their optimum potential they must be structurally intact and free of scratches, cracks, or leaks.

Optical fibers consist of a core material that is surrounded by a cladding. The difference between the indexes of refraction of the core and cladding materials (which, in some cases, are simply different types of fused silica glass) allows the optical fiber to function. Most commercially available optical fibers, in addition, have an external "buffer or jacket". The jacket is a thin coating (usually a plastic, other polymer, or metal) which is applied to the fiber to protect it from being scratched during handling and to limit the amount of water than can come into contact with the fiber. Scratching or contact with water or moisture can deleteriously affect both the optical properties and the strength of the glass fiber. In addition to shielding the fiber's surface, the buffer also operates to help maintain the high tensile strength and the bending capability of the glass optical fibers.

A number of fiber optic applications require that one terminus of the fiber be located in an environment isolated from the other terminus. This implies the use of a connector, coupling device, or "feedthrough" which serves as the point of communication between the distinct environments. Oftentimes, it is necessary or desirable for the point of communication between the environments to be completely sealed except for the presence of the optical fiber. Herein arises the need for a satisfactory method to hermetically seal optical fibers within metal fittings.

Fabrication of hermetic fiber optic-to-metal components has until recently been difficult due to a number of factors. Principal among these is the large thermal expansion mismatch between the very low coefficient of expansion of the optical fibers (most commonly made of fused silica glass) and the high coefficient of expansion of the metal shell to which the optical fibers are attached. This difference can cause severe stressing of the fiber optic components, especially where fabrication methods use application of heat, which, in turn, can cause undesirable cracks and leaks in the optical fibers.

A U.S. Pat. No. 5,143,531 in the name of Kramer issued Sep. 1, 1992 and assigned to the United States of America as represented by the United States Department of Energy, discloses a glass-to-glass hermetic sealing technique which can be used to splice lengths of glass fibers together. A solid glass pre-form is inserted into the cavity of a metal component which is then heated to melt the glass. An end of an optical fiber is then advanced into the molten glass and the entire structure is cooled to solidify the glass in sealing engagement with the optical fiber end and the metal cavity.

Another U.S. Pat. No. 5,337,387 in the name of the same inventor issued Aug. 9, 1994 and relates to a method of the continuous processing of hermetic fiber optic components and the resultant fiber optic-to-metal components by assembling and fixturing elements comprising a metal shell, a glass pre-form and a metal-coated fiber optic into desired relative positions and then sealing said fixtured elements, preferably using a continuous heating process.

Although Kramer's inventions for hermetically sealing optical fibers may perform their intended functions, the general approach is believed to be a relatively costly and somewhat complex.

Methods are known for placing and affixing optical fibers in ferrules and sleeves of different types for the purposes of providing a protective sheath for reducing damage to optical fibers that would otherwise be exposed, and for attempting to provide a housing for optical fibers. Furthermore, such ferrules or sleeves have been used as housings in which optical fibers are fused together. In many of these applications an adhesive such as epoxy is placed in the ferrule with the optical fiber to provide a bonded seal between the fiber and the ferrule.

In one U.S. Pat. No. 5,094,518 issued Mar. 10 1992 in the name of Musk a method of making an opto-electronic component comprises inserting a pre-assembled device carrier into a mould, filling the mould with a light and/or thermally curable material.

In yet another U.S. Pat. No. 5,061,034 in the name of Fujikawa et al. issued Oct. 29, 1991, a permanent connector for optical fibers comprises a protective glass tube, a capillary tube received therein and eccentrically joined thereto; the two tubes are made of ultraviolet-transmitting glass; an adhesive-passing groove is formed in the middle portion of the capillary tube and opening on the side opposite to the side where they are joined together. An ultraviolet-curing type adhesive agent is charged into the permanent connector for optical fibers and the ends of the fibers are inserted thereinto. Fujikawa's device and Musk's device are both relatively complex and do not appear to be optimal solutions for hermetically sealing an optical fiber.

Therefore, it is an object of this invention to provide a method of encapsulating an optical fiber that is practicable for hermetic optical fiber applications.

It is a further object of the invention to provide an inexpensive and reliable optical fiber feedthrough for hermetic optical fiber applications.

It is yet a further object of the invention to provide an epoxyless method of reinforcing an optical fiber by fusing it to a stiffening sleeve in the presence of heat.

SUMMARY OF THE INVENTION

In accordance with the invention, a method of encapsulating at least a portion of an optical fiber is provided comprising the steps of: providing a ferrule having a bore, the ferrule at least about and defining the bore comprising a material that is similar to and fusible with an optical fiber sized to tightly fit into the bore; inserting at least a portion of the optical fiber into the bore; heating the ferrule sufficiently to fuse at least a portion of the optical fiber inserted into the bore with the ferrule;

In accordance with the invention there is further provided, a method of encapsulating at least a portion of an optical fiber comprising the steps of: placing an optical fiber into a tube having an inner wall made of a material that will fuse to the fiber in the presence of suitable heat; and, vitrifying and collapsing said tube onto the fiber to encapsulate a portion of optical fiber within the tube.

In accordance with another aspect of the invention there is provided an optical fiber having an outer cladding substantially consisting of silica, the cladding on at least a portion of the optical fiber being encapsulated by and fused with a sleeve having an inner wall defining a bore into which the fiber is disposed, substantially consisting of silica.

Advantageously this invention provides a method of thickening a section of optical fiber by collapsing and fusing a tube of compatible material onto it. The thickened section comprising the at least fused fiber and tube can then be soldered thereby providing a hermetically sealed feedthrough. In particular, this method has been shown to exhibit significantly less stress damage and crack formation than hermetic fiber optic components made using other techniques.

BRIEF DESCRIPTION OF THE DRAWINGS

Exemplary embodiments of the invention will now be described in conjunction with the drawings, in which:

FIG. 1a is a is a cross sectional view of an optical fiber placed into an opening a ferrule having a stepped down opening for allowing a jacketed fibre to be inserted part way into the ferrule prior to the application of heat for collapsing the ferrule;

FIG. 2 is a cross sectional view of the optical fiber ferrule arrangement shown in FIG. 1 after the application of heat whereby the ferrule is shown collapsed onto the optical fiber;

DETAILED DESCRIPTION

The terms "sleeve, ferrule, and tube" shall be used interchangeably in this description to represent a housing having a bore at least partially defined therethrough.

Figure 1B:
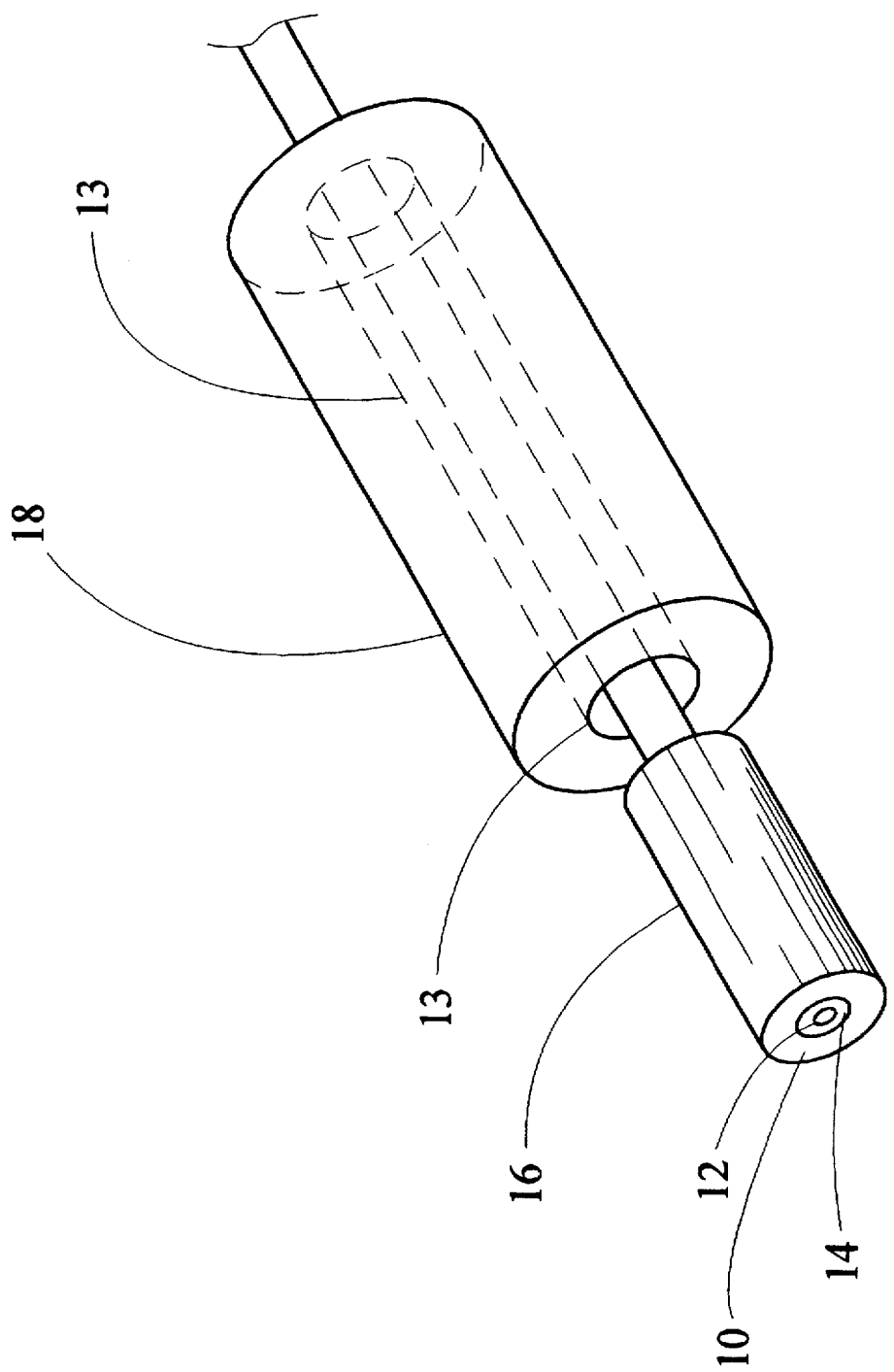
FIG. 1b a cross sectional view of an optical fiber placed into an opening a ferrule prior to the application of heat for collapsing the ferrule.
Figure 3:
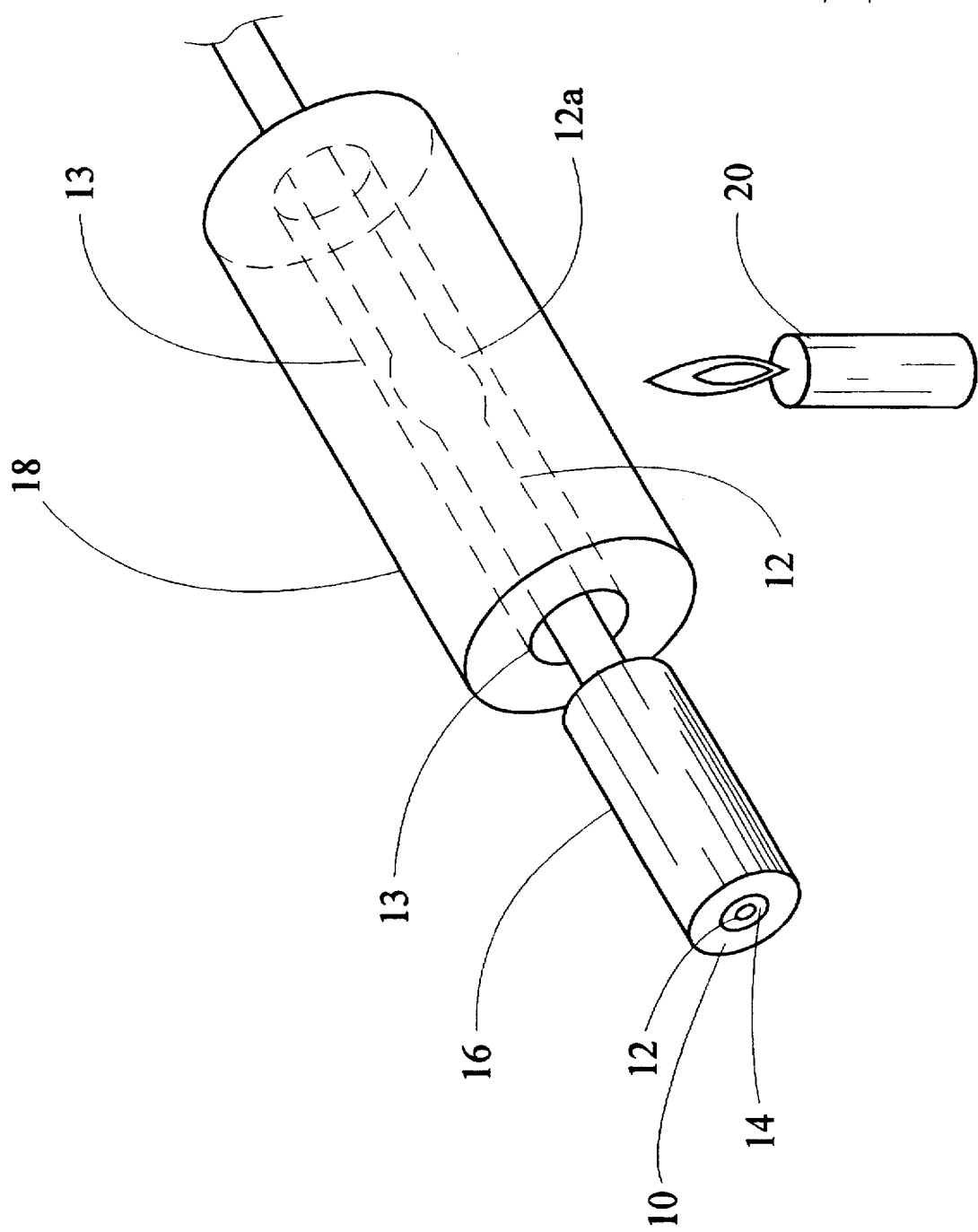
FIG. 3 is a cross sectional view of the optical fiber arrangement shown in FIG. 2 wherein the mode field diameter within the core of the optical fiber within the ferrule is thermally expanded.

Referring now to FIG. 1, a conventional optical fiber 10 is shown having a portion of its length inserted into a fiber tube or sleeve 18 consisting substantially of silica. The sleeve 18 can be a precision sleeve having a wall 13 defining an inner diameter as small as 125.1 μm to accommodate an optical fiber having an outer diameter of 125 μm or the inner diameter of the sleeve can be larger than 126 μm. The outer diameter of the sleeve is not confined to, but may be in the range of 1 mm. The optical fiber 10 has a core 12, and a cladding 14 that both consist substantially of silica having different refractive indexes; an outer protective jacket 16 is shown on a portion of the fiber outside the sleeve 18. Typical dimensions of the core 12 for single mode fiber are in the range of 6 to 12 μm. The outer diameter of the cladding 14 is generally about 125 μm and the protective jacket 16 outer diameter typically can ranges from 250 to 900 μm.

In an attempt to obviate known problems in the fabrication of hermetic fiber optic components related to thermal expansion mismatch between the very low coefficient of expansion of the fused silica glass optical fibers and the differing coefficient of expansion of the other materials, this invention provides a sleeve of a compatible material (silica) that is substantially matched in coefficient of expansion to that of optical fiber, thereby reducing stressing of the optical fiber in the application of heat which otherwise can cause undesirable cracks and leaks in the optical fibers.

Two materials that provide a match to optical fiber are silica substantially consisting of $SiO_2$ (nearly 100%) and Vycor™ (about 95% silica and partially consisting of Boron Oxide) available from the Corning Glass Co. Sleeves made of either of these materials will fuse to the cladding 14 that substantially consists of pure silica at temperatures of about 1800° C. Thus, it is preferred if the sleeve 18 consists of or at least substantially consists of the same material as the cladding 14.

Referring to FIG. 1a a ferrule 18a is shown having a stepped down inner wall 13a for allowing a jacketed fiber to be inserted part way into the opening. The stripped optical fiber is inserted through the ferrule 18a. Heat is provided to one end (not shown) and one portion of the tube is collapsed upon the fiber.

Figure 4B:
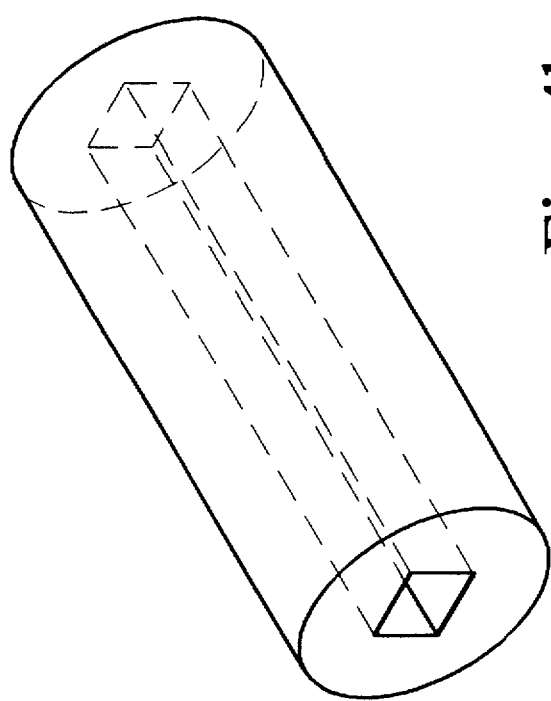
FIG. 4b is a pictorial view of a sleeve having a rectangular bore for accommodating a pair of optical fibers.
Figure 4D:
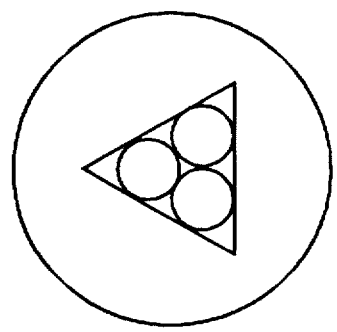
FIG. 4d is an end view of a sleeve having a bore with a triangular cross section.
Figure 4A:
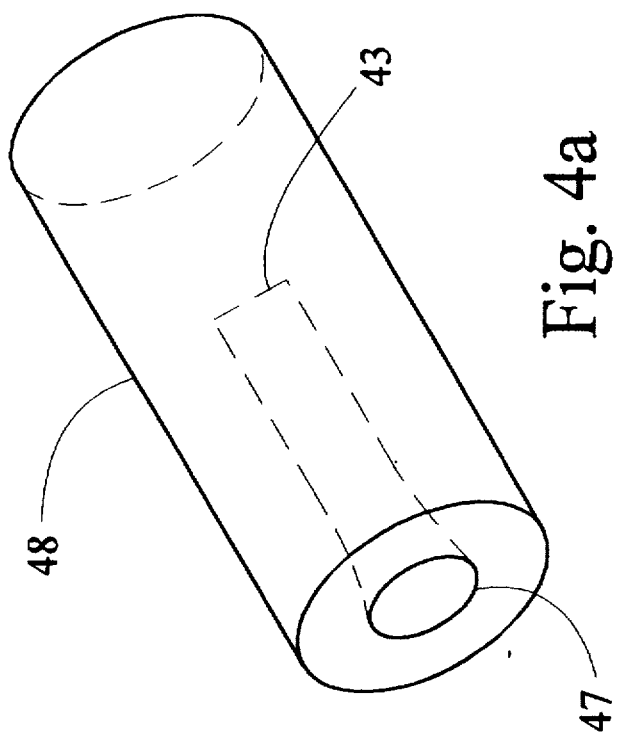
FIG. 4a is a cross sectional view of an alternative embodiment of a sleeve having flared ends for use in accordance with the invention.
Figure 4C:
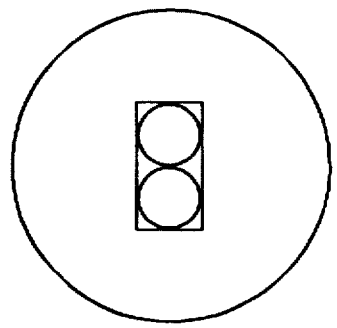
FIG. 4c is an end view of the sleeve shown in FIG. 4b.

Conveniently and optionally, the opening at the end of the sleeve 18 is flared to ease the entry of a fiber end into the end of the sleeve 18. Referring now to FIG. 4a, a sleeve 48 is shown having a flared end 47 and having bore extending only part-way through providing an opening into which a fiber end may be inserted, rather than providing a through-hole as shown in FIG. 1. In an alternative embodiment, bores having a cross-section other than circular can be provided. For example, and referring now to FIG. 4c, a substantially rectangular bore conveniently accommodates two optical fibers for fusion with the bore in the presence of sufficient heat. A triangular bore is shown in FIG. 4d for accommodating 3 optical fibers.

Figure 5A:
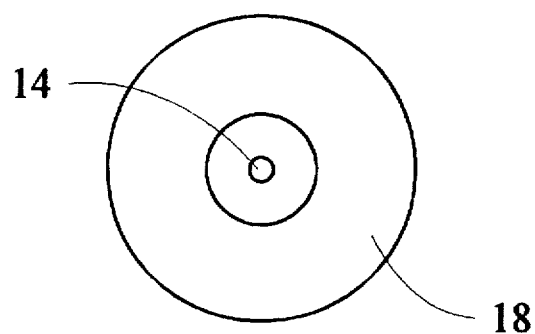
FIG. 5a is an end view of the sleeve shown in FIG. 1, collapsed on an optical fiber as is shown in FIG. 2.
Figure 5B:
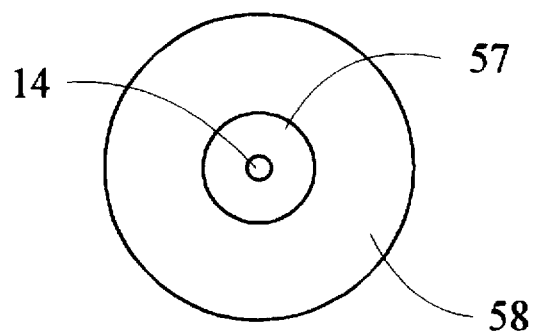
FIG. 5b is an end view of an optical fiber glued into a sleeve in a conventional manner; and, FIG. 6 is a side view of a sleeve shown with two optical fibers placed within prior to collapsing the sleeve on the optical fibers.

When the glass tube 18 is heated to a sufficient temperature external surface tension on the tube shrinks and collapses the diameter of the tube 18. FIG. 2 illustrates this process whereby a micro-flame burner 20 heats the silica tube 18 to about 1800° C. until the tube 18 collapses and at least partially fuses with the cladding 14. FIG. 5a illustrates complete fusion of the cladding and the tube inner diameter; the cladding and the tube are not differentiable and only the core of the fiber can be distinguished. In contrast to this, FIG. 5b shows a conventional arrangement where an optical fiber with adhesive in the form of epoxy is placed into a bore of a sleeve 58. The cross section shows a ring 57 defining a boundary of epoxy at the interface between the fiber cladding and the wall of the bore.

Referring once more to FIG. 2, advantageously by heating the tube 18 and consequently the fiber 10 inside the tube at such a high temperature, the mode field 12a of the core 12 expands, yielding a hermetically sealed optical fiber end with a thermally expanded core (TEC). Alternatively, the fiber can be placed in the sleeve, heated slowly (for a few hours) at a temperature of about 1300° C. to expand the mode field diameter of the core, and later can be heated at substantially higher temperatures to collapse the tube 18 onto the optical fiber cladding 14. Advantageously, and more importantly in applications where tolerances are very small, when the fiber is heated and fused to the sleeve, the core of the fiber self-centers within the sleeve. This simplifies later alignment of the reinforced fused fiber and sleeve.

Optionally, the tube 18 of the resulting encapsulated optical fiber can be soldered or dipped in metal bath to coat the outer periphery of the device. Of course other coating and depositing methods may be envisaged to apply a metal to the outside of the tube 18 for hermetic sealing with a metal package.

Figure 6:
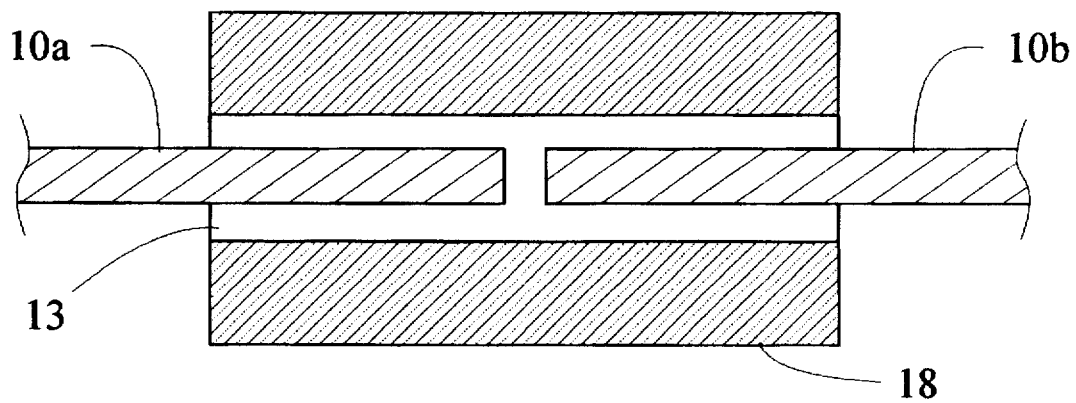

In an alternative embodiment of this invention shown in FIG. 6, the silica tube 18 described heretofore, can be used in a similar manner to reinforce and hold optical fibers, hermetically sealing them, however this embodiment provides for two optical fibers 10a and 10b to be held, reinforced, and fused end-to-end together inside the tube 18. First, ends of the fibers are placed into the tube 18 such that they are in contact to one another. Sufficient heat is then applied until the fibers have fused. Optionally, silica glass soot may be inserted into the tube prior to the placement of either fiber in the tube or after the placement of a first fiber and prior to the insertion of the second optical fiber. The soot, having a lower melting point than the optical fiber fuses and solders the adjacent ends of the fibers together inside the tube in the presence of heat applied to the tube 18.

Of course, numerous other embodiments may be envisaged, without departing from the spirit and scope of the invention.

What we claim is:

1. A method of encapsulating at least a portion of a single optical fiber having a diameter of about 125 μm comprising the steps of:

providing a ferrule having a bore having a diameter of substantially about 126 μm or less, the ferrule at least about and defining the bore comprising a material that has essentially a same coefficient of expansion, is similar to and fusible with, the optical fiber sized to fit into the bore;

inserting at least a portion of the optical fiber into the bore;

heating the ferrule sufficiently to fuse at least a portion of the optical fiber inserted into the bore with the ferrule.

2. A method as defined in claim 1, wherein the bore of the ferrule has a non-circular cross-section that substantially conforms to the one or more optical fibers.

3. A method as defined in claim 2, wherein the bore has a substantially rectangular cross-section.

4. The method as defined in claim 1, wherein the bore is a stepped down bore a portion of which has a first diameter and a portion of which has a smaller second diameter for accommodating a jacketed fiber and a stripped fiber respectively.

5. A method of encapsulating at least a portion of an optical fiber having an outer diameter of substantially about 125 μm, comprising the steps of:

placing the optical fiber into a tube both being like materials having a substantially same coefficient of expansion, the tube having a bore extending at least partially therethrough defined by an inner wall made of a material that will fuse to the fiber upon the application of a suitable heat, the bore having a diameter of less than or equal to 127 μm;

applying the suitable heat to the tube after placing the fiber into it to vitrify and collapse said tube onto the fiber to encapsulate and fuse a portion of optical fiber within the tube;

and then, allowing the tube to cool.

6. A method as defined in claim 5 further comprising the step of metalizing at least some of the outer periphery of the tube.

7. A method as defined in claim 5, wherein the step of applying a suitable heat is performed at a temperature and for a duration sufficient to expand the mode field diameter of the optical fiber placed into the tube such that the diameter of the expanded core is greater than the diameter of the same fiber proximate to but external to the tube.

8. A method as defined in claim 6, wherein the cooled tube is placed into a metal housing thereby providing a feedthrough to said housing.

9. A method as defined in claim 5, wherein the step of applying a suitable heat comprises heating the tube to a temperature substantially about 1800° C. or greater.

10. A method as defined in claim 5, wherein the inner wall of the tube is comprised of at least 90% $SiO_2$.

11. A reinforced optical fiber said optical fibre having an outer diameter of substantially about 125 μm said reinforced fibre consisting of a sleeve a portion of which has an inner diameter of less than or about 127 μm prior to being collapsed the sleeve made essentially of a material that is at least similar to a clad portion of the optical fiber, the sleeve enveloping and being collapsed upon the clad portion of the optical fiber and being in optical contact therewith.

12. The at least one or more reinforced optical fibers as defined in claim 11, wherein the one or more optical fibers and the collapsed sleeve are fused together.

13. The at least one or more reinforced optical fiber as defined in claim 12, wherein the clad portion and the sleeve are each comprised of at least 90% silica.

14. The at least one or more reinforced optical fibers as defined in claim 13, wherein at least a portion of which has an expanding mode field diameter along its longitudinal axis, said at least portion of the core being larger in diameter than the core of other portions of the one or more optical fibers not reinforced.

* * * * *